United States Patent
Wu et al.

(10) Patent No.: US 6,594,271 B1
(45) Date of Patent: Jul. 15, 2003

(54) IMPLEMENTATION OF OPPORTUNISTIC DATA ON A STATISTICAL MULTIPLEXING ENCODER

(75) Inventors: Siu-Wai Wu, San Diego, CA (US); Kevin Wirick, Encinitas, CA (US)

(73) Assignee: General Instruments Corporation, Horsham, PA (US)

( * ) Notice: Subject to any disclaimer, the term of this patent is extended or adjusted under 35 U.S.C. 154(b) by 0 days.

(21) Appl. No.: 09/356,529

(22) Filed: Jul. 19, 1999

(51) Int. Cl.[7] ............................ H04L 12/28; H04J 3/16; H04J 3/02
(52) U.S. Cl. .................... 370/412; 370/468; 370/537
(58) Field of Search ................................. 370/232, 230, 370/235, 412, 401, 414, 419, 465, 468, 537, 538

(56) References Cited

U.S. PATENT DOCUMENTS

| | | | |
|---|---|---|---|
| 5,216,503 A | | 6/1993 | Paik et al. |
| 5,432,790 A | * | 7/1995 | Hluchyj et al. ............. 370/412 |
| 5,455,826 A | * | 10/1995 | Ozveren et al. ............. 370/232 |
| 5,506,844 A | * | 4/1996 | Rao ............................ 370/468 |
| 5,577,035 A | * | 11/1996 | Hayter et al. ............... 370/468 |
| 5,583,857 A | * | 12/1996 | Soumiya et al. ............ 370/233 |
| 5,864,557 A | | 1/1999 | Lyons |
| 5,936,958 A | * | 8/1999 | Soumiya et al. ............ 370/389 |
| 6,052,384 A | * | 4/2000 | Huang et al. ................ 370/468 |
| 6,240,103 B1 | * | 5/2001 | Schoenblum et al. ....... 370/468 |
| 6,249,527 B1 | * | 6/2001 | Verthein et al. ............. 370/401 |
| 6,310,915 B1 | * | 10/2001 | Wells et al. .............. 348/405.1 |

\* cited by examiner

*Primary Examiner*—Chau Nguyen
*Assistant Examiner*—Andy Lee
(74) *Attorney, Agent, or Firm*—Barry R. Lipsitz; Douglas M. McAllister

(57) ABSTRACT

A method and apparatus for providing an opportunistic data capability for an existing statistical multiplexing encoder platform, such as a multi-channel video data encoder. An Opportunistic Data Processor (ODP) is provided as a plug-in card or an external device that can be interfaced with an existing multi-channel encoder. The ODP communicates with a Quantization Level Processor (QLP) and Packet Multiplexer (PM) in the multi-channel encoder as if it was just another channel encoder. The ODP implements a special rate control scheme by encoding data and sending it to the PM only when a global Quantization Level (QL) indicates that spare bandwidth is available. Spare bandwidth is assumed to be available when the global QL is less than a threshold value. Moreover, the OPD sends a bandwidth need parameter to the QLP, as do the other channel encoders. However, the ODP's need parameter is scaled by a function of the global QL to attenuate its actual bandwidth need as the global QL increases to provide smooth variations in the ODP's encoded data rate.

24 Claims, 2 Drawing Sheets

IMPLEMENTATION OF OPPORTUNISTIC DATA ON A STATISTICAL MULTIPLEXING ENCODER

BACKGROUND OF THE INVENTION

The present invention relates to a method and apparatus for providing an opportunistic data capability for an existing statistical multiplexing encoder platform, such as a multi-channel video data encoder. The invention relates generally to statistical multiplexing, wherein a bit rate (e.g., bandwidth) is allocated to the different channels based on the channels' bit rate needs and the overall available bandwidth.

Statistical multiplexing is the process of encoding a number of signals at variable bit rates and combining the variable-rate bitstreams into a single fixed-rate transport stream so that the bandwidth allotted to each signal is flexible and varies with each signal's bit rate need. Conventionally, an estimate of bit rate need is made based on signal statistics. After a bit rate is allocated based on the need, the data in each signal is compressed and encoded using a specific quantization level. The amount of data that results from the compression is examined in each channel, and the quantization level is adjusted so that channels with more encoded data receive a higher bit rate. Next, the video data is compressed and encoded again using the adjusted quantization level. The process may be repeated successively.

Currently, statistical multiplexing encoding platforms are defined according to, e.g., the DigiCipher(R) II system that is proprietary to General Instrument Corporation, the assignee hereof.

However, because of the existing installed base of such video encoders, e.g., at television studios, cable and satellite network headends, and other facilities, it would be desirable to provide a capability for opportunistic data processing for the statistical multiplexing (stat mux) mode with minimal hardware or firmware modifications to the existing digital video encoder platforms.

For example, it would be preferable to provide a plug-in card or an external box to process the opportunistic data and interface to the existing multi-channel video encoder.

The opportunistic data processing should allow additional data to be carried in the transport stream when "spare" bandwidth is available, such as when the low complexity video sources are being encoded at the other channel encoders. The opportunistic data may include any type of data, such as side information for updating software at subscriber terminals in a television network, bank transaction data, Internet web page (Hypertext Markup Language—HTML) data, Java(R) applet data, still frame video for shopping channels, games, computer software, polling data, contest data, data for interactive programs, weather data, stock data, conditional access data, program guide data, or movie data which can be downloaded for viewing at a later time.

The system should allow an opportunistic data processor to be treated by a packet multiplexer of a stat mux encoder as if it were another channel encoder, e.g., by having the same statistical information and quantization level information communicated between the opportunistic data processor and the packet multiplexer.

The system should be compatible with current statistical multiplexing encoding platforms, e.g., the DigiCipher(R) II system.

The present invention provides a system having the above and other advantages.

SUMMARY OF THE INVENTION

The present invention relates to a method and apparatus for providing an opportunistic data capability for an existing-statistical multiplexing encoder platform, such as a multi-channel video data encoder.

The opportunistic data allows various types of data to be carried in the spare bandwidth of a digital transport stream.

In accordance with the present invention, a multi-channel statistical multiplexing encoder has a plurality of channel encoders with respective buffers for receiving respective data sources (such as video data).

An Opportunistic Data Processor (ODP) has a respective buffer for receiving a respective data source (which can be any type of data, video or otherwise). The multiplexing encoder has a packet multiplexer for receiving encoded data from the channel encoders and the ODP for forming a transport stream, and a quantization level processor associated with the packet multiplexer. The channel encoders and the ODP send their bandwidth need parameters to the quantization level processor, and in response, the quantization level processor provides bandwidth allocations and a global quantization level to the channel encoders and the ODP. The channel encoders and the ODP encode their respective data sources according to the global quantization level and the respective bandwidth allocations. Moreover, the ODP generates its bandwidth need parameter: (a) by scaling its bandwidth need by a function of the global quantization level, and (b) according to a threshold quantization level.

In particular, the ODP generates its bandwidth need parameter such that essentially no bandwidth is allocated to the opportunistic data processor when the global quantization level exceeds the threshold quantization level. The ODP generates its bandwidth need parameter such that bandwidth is allocated to the opportunistic data processor only when the global quantization level is less than the threshold quantization level.

The bandwidth need of the ODP may be responsive to the ratio of the fullness level of the opportunistic data processor's buffer to the size of the buffer.

The bandwidth need of the ODP may be scaled by the range of the need parameter. In the case of DigiCipher II system, the range of the need parameter is the size of the channel encoder's buffers.

The function of the global quantization level attenuates the bandwidth need of the opportunistic data processor progressively more as the global quantization level is progressively greater.

In particular, the function may monotonically decrease as the global quantization level increases. The function may increase toward a value of one as the global quantization level decreases toward a minimum value. In this case, no scaling of the bandwidth by the function is applied.

The global quantization level may be determined according to an average of the bandwidth need parameters of the channel encoders. The bandwidth need parameters of the channel encoders may be indicative of a local quantization level thereof. Specifically, the global quantization level may be determined according to an average of the local quantization levels of the channel encoders.

An interface may be provided for interfacing the opportunistic data processor to the packet multiplexer and the quantization level processor. This allows an easy retrofit of existing multi-channel encoders in the field.

Or, the ODP may be built into the multi-channel encoder.

Further in accordance with the present invention, an Opportunistic Data Processor (ODP) apparatus is provided for use with a multi-channel statistical multiplexing encoder. The apparatus includes an ODP with a respective buffer for receiving a respective data source, and an interface for allowing the ODP to communicate with a packet multiplexer and a quantization level processor of the multi-channel statistical multiplexing encoder.

The ODP provides a bandwidth need parameter to the quantization level processor via the interface, and, in response thereto, receives a bandwidth allocation and a global quantization level from the quantization level processor via the interface. The ODP generates its bandwidth need parameter: (a) by scaling a bandwidth need thereof by a function of the global quantization level, and (b) according to a threshold quantization level.

The quantization level processor also receives bandwidth need parameters from a plurality of channel encoders, and, in response, provides bandwidth allocations and the global quantization level to the plurality of channel encoders. The channel encoders and the opportunistic data processor encode their respective data sources according to the global quantization level and the respective bandwidth allocations.

The packet multiplexer receives encoded data from the plurality of channel encoders and the opportunistic data processor for forming a transport stream.

The interface may be provided, for example, by a card (circuit board) that plugs into a chassis of the multi-channel statistical multiplexing encoder, where the ODP is located on the card.

Or, the ODP may be provided in an external device (housing).

A corresponding method is also presented.

DETAILED DESCRIPTION OF THE INVENTION

The present invention relates to a method and apparatus for providing an opportunistic data capability for an existing statistical multiplexing encoder platform, such as a multi-channel video data encoder.

Figure 1:
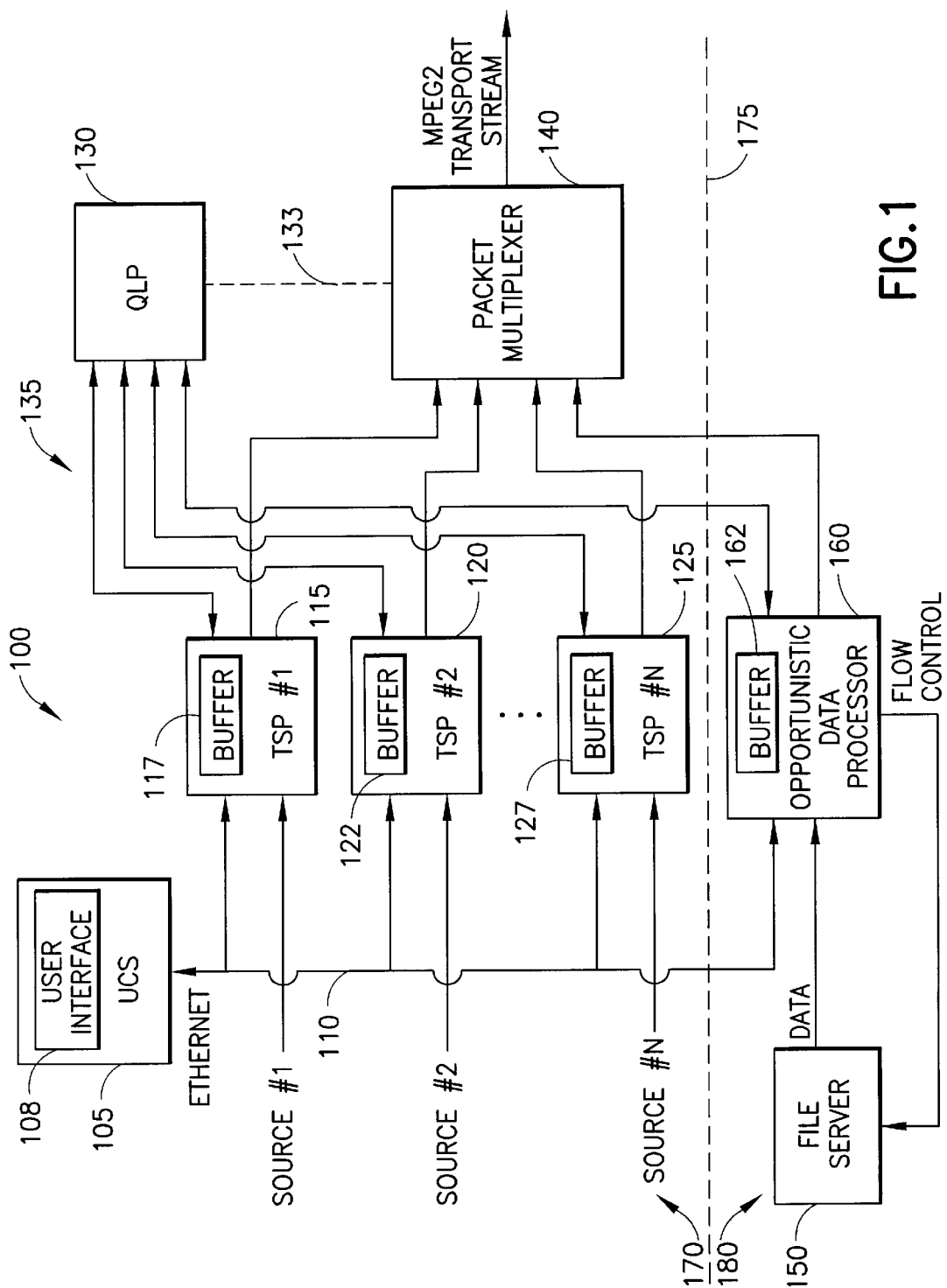
FIG. 1 illustrates a multi-channel encoder with opportunistic data processing in accordance with the present invention.

FIG. 1 illustrates a multi-channel encoder 100 with opportunistic data processing in accordance with the present invention. Note that the components of FIG. 1 need not be physically separate but may be implemented in shared hardware, firmware and/or software.

Advantageously, a pre-existing multi-channel encoder 170, which employs essentially any known stat mux scheme, may be modified to include an Opportunistic Data Processing (ODP) system 180. This arrangement provides cost savings and minimizes disruption to the existing encoders in the field. Alternatively, the ODP system 180 can be provided in a custom built multi-channel encoder.

A dashed line 175 denotes an interface between the pre-existing multi-channel encoder 170 and the ODP system 180. The ODP system 180 can be provided as a plug-in card, or as an external box that interfaces with the existing multi-channel video encoder 170.

The system should allow an ODP to be treated by a packet processor of a stat mux encoder as if it were another channel encoder, e.g., by having the same statistical information and quantization level information communicated between the ODP and the packet processor.

The pre-existing multi-channel encoder 170 includes a number N of channel encoders, referred to as Television Service Processors (TSPs), including TSP #1 (115), TSP #2 (120), . . . , TSP #N (125) for encoding source data from respective sources 1, 2, . . . N. The TSPs 115, 120, . . . , 125 have respective buffers 117, 122, . . . , 127, such as first-in first-out (FIFO) buffers, for storing data from the respective sources. Television signals (e.g., digital video and audio) are referred to in this example only for illustration purposes. The source data may comprise any type of digital data.

The TSPs use known data encoding techniques.

A Quantizer Level Processor (QLP) 130 communicates with the TSPs via path 135 by receiving statistical information from the TSPs and providing a Quantizer Level (QL) to the TSPs. The QL is used by the TSPs to determine a quantization step size to use for encoding the respective source data. The QLP 130 can be implemented as a Digital Signal Processor (DSP) circuit which is part of a Packet Multiplexer (PM) 140. This association is indicated by the dashed line 133.

The ODP 160 also has an associated buffer 162, such as a FIFO buffer.

An Uplink Control System (UCS) 105 communicates with the TSPs via a network such as an Ethernet(tm). The UCS 105 can be implemented as a computer program running, e.g., on Digital Equipment VAX(tm) to provide a graphical user interface for the encoder system. An alternative is to use a PC-EMC (Encoder Monitor Controller), which performs the same functions but runs on a PC using Windows NT(R), for example.

The TSPs provide their respective encoded source data to the PM 140 to form a transport stream, such as one that conforms to the MPEG-2 standard.

The ODP system 180 includes a file server 150, which stores the opportunistic data, and an Opportunistic Data Processor (ODP) 160, which encodes the opportunistic data and forwards it to the packet multiplexer 140 for inclusion in the transport stream at specific times when spare bandwidth is available. The file server 150 forwards its data to the ODP 160 in response to a flow control signal.

The UCS 105 and QLP 130 communicate with the ODP 160 via the interface 175 as if it was just another channel encoder (e.g., TSP).

The ODP 160 can be a board (e.g., card) that resides on (e.g., plugs into) a Digital Service Encoder (DSE) slot in the encoder chassis, or an external box that connects to the encoder 170 via an available cascade transport inputs, for example. Advantageously, existing encoders in the field can be retrofitted with an ODP capability.

To avoid modifying the encoder 170, the algorithm used by the ODP assumes that the PM, TSPs and the UCS do not have knowledge about the existence of the ODP. The encoder 170 treats the ODP 160 as if it is a regular TSP, such as the TSPs 115, 120, . . . , 125. The normal statistical multiplexing algorithm will run on the PM 140 and the real TSPs 115, 120, . . . , 125, while the opportunistic data rate control algorithm of the present invention will run on the ODP 160.

The ODP 160 presents itself to the PM 140 and UCS 105 as another TSP, that is, having exactly the same hardware and software interfaces as a TSP. The ODP 160 monitors a global QL value that is broadcast by the QLP 130 and controls a bandwidth of the ODP 160 accordingly, as discussed further below.

The ODP's buffer 162 buffers the opportunistic data that is input, e.g., from the file server 150 or other source. The opportunistic data can include any type of low bit rate data that is related or not to the data from the sources #1, #2, . . . , #N.

The ODP 160 applies a flow control signal to the file server 150 to stop the data feed when the buffer 162 is full, that is, when opportunistic bandwidth is not available.

Based on information received from QLP 130, such as the global QL, the ODP 160 determines when the TSPs do not need all available bandwidth of the transport stream. At these times, the ODP 160 packetizes the opportunistic data and sends the resulting packets to the PM 140 for inclusion in the MPEG-2 transport stream.

A user interface 108 may be incorporated as part of the UCS software, e.g., to allow the user to set a non-zero min_br value to guarantee a minimum data bandwidth.

The ODP 160 implements an opportunistic data rate control algorithm for setting its bandwidth in accordance with the present invention. The goal of the opportunistic rate control algorithm is to minimize the impact on the quality of the regular video services, while using any excess available bandwidth for the opportunistic data. Thus, the opportunistic data is enabled only when the global QL of the multiplex drops below a threshold, where any further decrease in the QL value contributes little improvement to the video quality.

With most statistical multiplexing algorithms, each TSP 115, 120, . . . , 125 periodically sends statistical information to the QLP 130, including, e.g., a "need parameter" that indicates the bandwidth need of the TSP, the maximum bit rate (max_br) and the minimum bit rate (min_br) allowed by the TSP at the current buffer level that guarantee both the encoder's buffer and the decoder's buffer do not underflow or overflow. The need parameter may be based on the TSP's buffer fullness level, for example. Generally, as the buffer fullness level increases, its need parameter increases to avoid a buffer overflow.

The QLP 130 then calculates a global QL value, and broadcasts this global QL value to all TSPs, e.g., via path 135. A global QL may be determined as discussed, e.g., in U.S. Pat. No. 5,216,503 to Paik et al., incorporated herein by reference, wherein a look up table outputs a global QL in response to data indicative of the total amount of data in each channel encoder's buffer. Alternatively, the QLP 130 may calculate the global QL based on an average of the quantization levels received from the TSPs.

The QLP 130 also allocates the available bandwidth to each individual TSP 115, 120, . . . , 125 in proportion to the TSP's need parameter. The maximum and minimum bit rate values signaled by the TSPs bound the bandwidth allocation.

The rate at which data enters the TSPs buffers is controlled by the local quantization level (QL), and the output rate is controlled by the packet rate (e.g., allocated bandwidth) to the PM 140. In statistical multiplexing, both the input rate (QL) and the output bitrate are adjusted in order to maintain a fixed bitrate over several video services, and maintain a consistent video quality across the channels.

A higher quantization level (e.g., finer, or less coarse quantization) correlates with a higher encoded data rate.

The idea behind statistical multiplexing is that individual services in a stat mux group should not be able to dictate their local QL themselves. Instead, a global QL is provided by the QLP 130 for all the video elementary streams, and the local TSPs can only modify this QL if system robustness targets are not being met. As the complexity of each sequence varies and different picture types are processed, however, each TSP's bandwidth need parameter will change. The bit rate assigned to each service varies with this need parameter.

Thus, contrary to a fixed rate operation, where the bitrate of a video stream is fixed and the QL is changed to maintain this bitrate, with a stat mux, the QL is more or less constant over the multiplex and the bitrate is changed to handle changes in sequence complexity. This enables the more complex parts of a stat mux group at a given time to be assigned more bandwidth, causing bandwidth to be used more efficiently over the entire multiplex.

The global QL value is thus computed based on all the TSP's need parameters. Moreover, the ODP 162 also provides a need parameter to the QLP 130 for use in determining the global QL. However, the ODP 162 "tricks" the QLP 130 into assigning it bandwidth only when the ODP 160 determines that excess (spare) bandwidth that is not being used by the TSPs is available. This is achieved by having the ODP 160 send a zero need parameter to the QLP 130 even when the ODP 160 has data to send, but when it has determined that no excess bandwidth is available.

The bitrate (BR) and QL for all the services is determined based on information that is exchanged between the TSPs 115, 120, . . . , 125 and the QLP 130 during the BR/QL cycle. This cycle takes place synchronously over all the TSPs and may repeat in a period that is somewhat shorter than a NTSC full resolution slice time. During the BR part of the cycle, all the TSPs send their current need parameter(s) size to the QLP 130 and accept and deploy a bitrate from the QLP.

During the QL part of the cycle, each TSP sends the QLP a bitrate range it has computed to ensure its continued robust operation, along with the need parameter, and accepts a global QL from the QLP. The global QL is not incorporated into each TSP's local QL calculations until the beginning of the next slice at that QL. The bitrate, however, is immediately deployed (e.g., with a maximum two transport packet delay). The two parts of the BR/QL cycle split it into equal halves.

Additionally, the encoder has the information to determine the fullness of the decoder's FIFO based on previous frame sizes, total system delay, and the fullness of the encoder's FIFO. This knowledge is used to model the status of the decoder's FIFO to insure Video Buffering Verifier (VBV) compliance, and to protect the decoder FIFO from underflowing or overflowing. The decoder's FIFO model, together with the encoder's buffer level, is used by the encoder to calculate the minimum bandwidth (min_br) and maximum bandwidth (max_br) requirements.

In accordance with the present invention, the ODP 160 communicates with the QLP 130 using the same protocol as a regular TSP. The bit rate of the opportunistic data is determined by the result of the bandwidth allocation process at the QLP 130, which is indirectly controlled by the need parameter, maximum bit rate and minimum bit rate sent from the ODP 160 and the TSPs 115, 120, . . . , 125 to the QLP 130. The ODP 160 monitors the global QL value continuously, and performs the following operations.

If the global QL value is above a threshold $QL_{th}$ (e.g., $QL \geq 5$), the ODP will send max_br=0 and a need parameter=0 to the QLP. This will make the QLP 130 assign zero bandwidth to the ODP, therefore effectively shutting down the flow of opportunistic data to the PM 140, even when there is opportunistic data waiting to be sent.

If the global QL value drops below the threshold (e.g., QL<5), this means there is spare bandwidth available for the opportunistic data, and the ODP 160 will send a non-zero max_br value to the QLP 130 so that the opportunistic data bandwidth will be upper bounded by max_br.

It is assumed that, below a certain global QL level, a further decrease in the quantization level will not make a significant incremental improvement to the video quality.

Note that it is also possible to use lower and upper QL thresholds instead of a single threshold to provide a hysteresis region. For example, in the above example, a determination could be made as to whether the global QL value was above an upper threshold, such as 5, or below a lower threshold, such as 4. The use of the function F(global QL), described below, can be selected to gradually vary the opportunistic data bandwidth without requiring a hysteresis region, although a hysteresis region may be used if desired.

The need parameter sent by the ODP 160 to the QLP 130 can be the ODP's buffer fullness scaled by the TSPs' buffer size (i.e., the size of the FIFOs 117, 122, . . . , 127), that is:

need parameter=F(global QL)×Current ODP Buffer Level×Range of need parameter/ODP buffer size, where F(global QL) is a function of the global QL value. For example, in the DigiCipher II system, the range of the need parameter is the same as the video decoder's buffer size, which is 1.835 Mbits. Essentially, the ODP's bandwidth need parameter is increasingly attenuated from the actual bandwidth need as the global QL increases. This provides for smooth variations in the ODP's encoded data rate. Moreover, a large step-like increase in the ODP's encoded data rate is avoided when the encoded data rate (bandwidth) of the transport stream is close to its maximum value.

As QL decreases, the value of F(global QL) increases, which results in more bandwidth allocated to the opportunistic data since there is more "spare" bandwidth that is not needed by the TSPs. Likewise, F(global QL) decreases as QL increases, which results in less bandwidth allocated to the opportunistic data since there is less "spare" bandwidth. When QL exceeds the threshold value, the flow of ODP data is shut down. Essentially, a higher global QL means the TSPs are encoding data with a higher complexity, and therefore require a higher bit rate to maintain a constant quality level.

The value of F(global QL) is always less than or equal to 1.0 so that the need parameter never exceeds Current ODP Buffer Level x TSP buffer size/ODP buffer size. For example, F(global QL) can be implemented as a look up table to be fine-tuned empirically. Additionally, F(global QL) should equal one when global QL equals one, which is the lowest global QL value. F(global QL) should also be monotonic decreasing as global QL increases, and always be positive. F(global QL) can be a linear, piece-wise liner, or non-linear function.

One example of a possible linear function is F(global QL)=1-(alpha*(global QL-1)/($Q_{th}$-1)), where alpha is any number between zero and one, e.g., 0.5.

The value of max_br is calculated in a similar fashion as that in the regular statistical multiplexing algorithm such that the ODP's buffer will not underflow at the current opportunistic data bandwidth.

When the global QL>$QL_{th}$, the ODP 160 sends a need parameter=0 and max_br=0 to the QLP 130 so that it does not influence the global QL calculation that determines the video quality of the multiplex.

The ODP 160 also sends a default value of min_br=0 to the QLP so that it does not impose any static loading to the multiplex.

However, it is possible to allow a user to set a non-zero min_br (e.g., via the user interface 108) to guarantee a minimum opportunistic data bandwidth.

When the global QL<$QL_{th}$, the ODP 160 sends its calculated (non-zero) need parameter, and a nonzero max_br to the QLP 130.

It is assumed that the global QL value broadcast by the QLP 130 is an indication of the video quality in the system. However, in reality, individual TSPs may modify this global QL value locally to generate the actual QL they use to quantize the respective source data. Therefore a small global QL value does not always guarantee that every TSPs in the multiplex is using a small quantization level. The impact of such non-ideal situation on the video quality can be evaluated by experiment.

Figure 2:
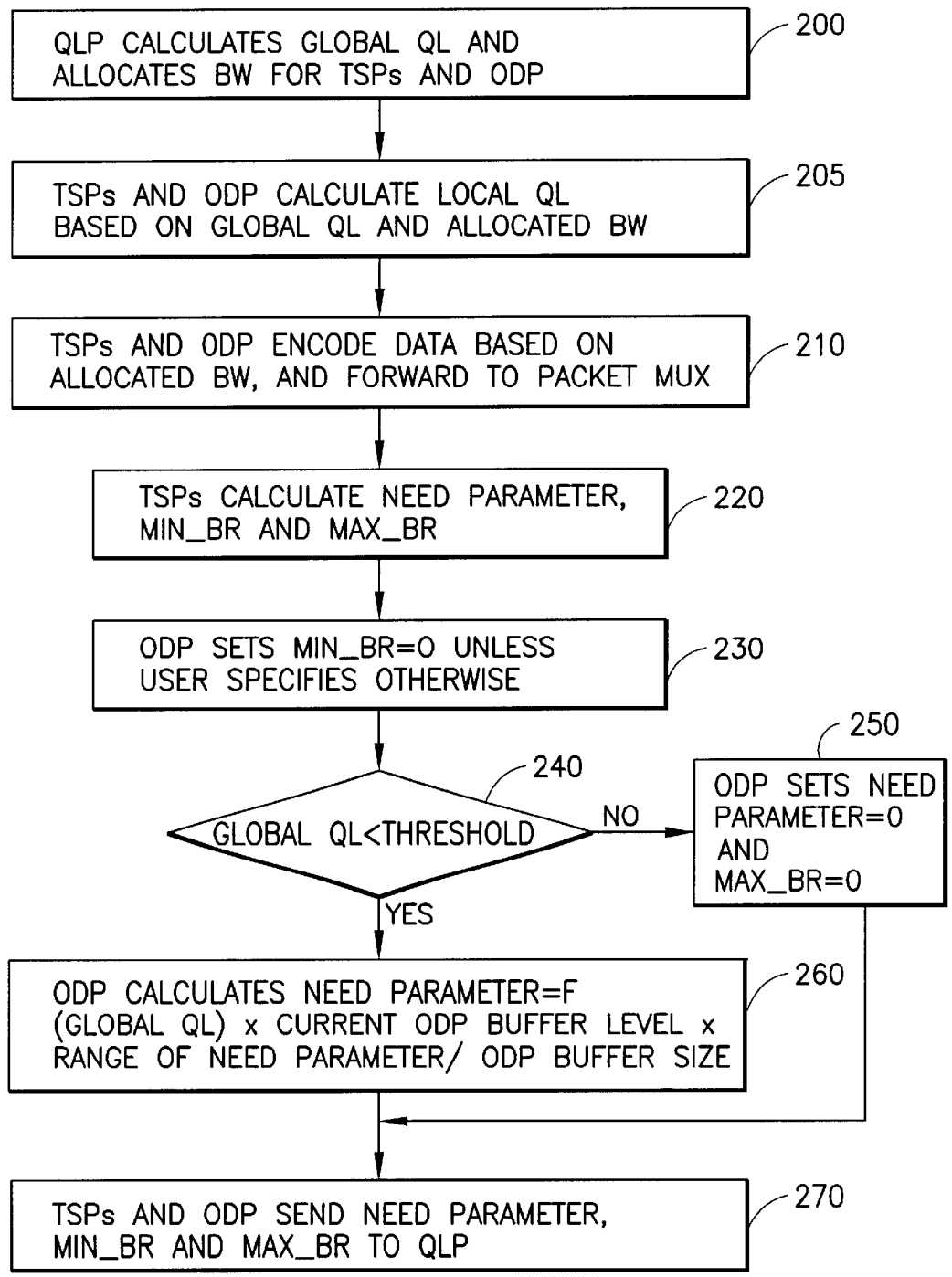
FIG. 2 illustrates an opportunistic data processing method in accordance with the present invention.

FIG. 2 illustrates an opportunistic data processing method in accordance with the present invention.

At block 200, the Quantizer Level Processor (QLP) calculates a global Quantization Level (QL). The QLP also allocates bandwidth (BW) for each of the encoders/Television Service Processors (TSPs) and the opportunistic Data Processor (ODP). Note that the BW that is allocated to the ODP my be zero. The QLP then forwards the global QL and allocated BW to the TSPs and the ODP.

At block 205, the TSPs and ODP calculate their local quantization levels for encoding data based on the allocated bandwidth and global QL. The local QL is determined using known techniques by increasing or decreasing a previous value of the QL based on local statistics.

At block the TSPs and ODP encode data using the local QL (e.g., step size) and forwarded the encoded data to a packet multiplexer to form a transport stream.

At block 220, the TSPs calculate a bandwidth new parameter, a minimum bit rate, min_br and a minimum bit rate, max_br.

At block 230, the ODP sets its min_br=0 unless a user specifies a non-zero min_br.

At block 240, if the global QL is not less than a threshold value, $QL_{th}$, the ODP sets its need parameter and max_br=0. This ensures that no BW is allocated to the ODP. If the global QL is less than the threshold value, $QL_{th}$, the ODP calculates a need parameter in accordance with the present invention as F(global QL)×Current ODP Buffer Level× Range of need parameter/ODP buffer size at block 260.

At block 270, the TSPs and the ODP send the revised need parameters, min_br and max_br to the QLP, and.processing repeats in a successive cycle at block 200.

Note that the present invention can be generalized for use with most stat mux schemes. The terminology and syntax used herein, e.g., min_br, max_br, and need parameter, can be interpreted in view of the corresponding parameters used by the other stat mux algorithms.

Almost all stat mux algorithms use a min_br and a max_br to protect the TSP buffers, and have a QLP assign the BW to each individual TSP. For example, the QLP may assigns the BW in proportion to the buffer fullness of each TSP. Or, the need parameter may be calculated from the statistics of the input video. The TSPs send their respective need parameters to the QLP, and the QLP allocates the bandwidth to the TSPs in proportion to the need parameters.

The need parameter can be interpreted as an estimate of the desired quantization level. Global QL is calculated by the QLP from the average need parameter collected from all the TSPs. Global QL is the QLP's estimate of the desired quantization level to be used by every TSP. Note that the ODP will not affect the global QL value when it is not sending data to the PM since its need parameter is zero. When the ODP is sending data to the PM, it will affect the global QL value since it is occupying bandwidth in the multiplex.

The final (i.e., local) quantization level used by each TSP is derived from a combination of the global QL and a locally estimated QL.

Optionally, the TSPs can send the actual quantizer level being used to the QLP. The TSP's quantizer level will be determine by the scheme that is particular to the stat mux algorithm. The QLP then calculates the global QL as the average of the quantization levels received from the TSPs, and sends it to the ODP and the TSPs. The ODP then monitors and uses the global QL as discussed.

For some stat muxes, the global QL is not used by the TSPs as part of the stat mux algorithm. In this case, only the ODP uses the global QL. A software modification of the encoders may be needed in this case to generate the global QL.

Accordingly, it can be seen that the present invention provides a method and apparatus for providing a stat mux encoder system with an opportunistic data capability. Moreover, the invention enables an Opportunistic Data Processor (ODP) to be treated as another channel encoder, such as a Television Service Processor (TSP). A bandwidth need parameter of the ODP is determined by scaling the current ODP's buffer level by the ODP's buffer size and the range of the need parameter.

Essentially, as the buffer level increases, the need for bandwidth increases to avoid approaching the maximum buffer capacity.

Moreover, the ODP's buffer level is scaled by a function F(global QL) that accounts for the global quantization level, or average of the quantization levels of the TSPs. F(global QL) reduces the buffer level that the ODP provides to the QLP as the global QL increases, since less "spare" bandwidth is available.

In particular, if the global QL is above a threshold value, the ODP sends a need parameter of zero to the QLP so that no bandwidth is allocated to the ODP. If the global QL is below the threshold value, this indicate that spare bandwidth is available, so the ODP sends a non-zero need parameter to the QLP so that bandwidth will be allocated to it.

Although the invention has been described in connection with various specific embodiments, those skilled in the art will appreciate that numerous adaptations and modifications may be made thereto without departing from the spirit and scope of the invention as set forth in the claims.

For example, while various syntax elements have been discussed herein, note that they are examples only, and any syntax may be used.

While the invention has been discussed in connection with the MPEG-2 and Digicipher(R) II standards, it should be appreciated that the concepts disclosed herein can be adapted for use with any similar communication standard.

Moreover, the invention is suitable for use with virtually any type of network, including cable or satellite television broadband communication networks, local area networks (LANs), metropolitan area networks (MANs), wide area networks (WANs), internets, intranets, and the Internet, or combinations thereof.

What is claimed is:

1. A multi-channel statistical multiplexing encoder, comprising:

a plurality of channel encoders with respective buffers for receiving respective data sources;

an opportunistic data processor with a respective buffer for receiving a respective data source;

a packet multiplexer for receiving encoded data from the channel encoders and the opportunistic data processor for forming a transport stream; and a quantization level processor associated with the packet multiplexer; wherein:

the channel encoders and the opportunistic data processor send bandwidth need parameters thereof to the quantization level processor;

the quantization level processor provides bandwidth allocations and a global quantization level to the channel encoders and the opportunistic data processor according to the bandwidth need parameters;

the channel encoders and the opportunistic data processor encode their respective data sources according to the global quantization level and the respective bandwidth allocations;

the opportunistic data processor generates its bandwidth need parameter: (a) by scaling a bandwidth need thereof by a function of the global quantization level, and (b) according to a threshold quantization level; and the opportunistic data processor generates its bandwidth need parameter such that essentially no bandwidth is allocated to the opportunistic data processor when the global quantization level exceeds the threshold quantization level.

2. The encoder of claim 1, wherein:

said bandwidth need of said opportunistic data processor is responsive to a fullness level/size ratio of the opportunistic data processor's buffer.

3. The encoder of claim 1, wherein:

said bandwidth need of said opportunistic data processor is scaled by a range of the bandwidth need parameters.

4. The encoder of claim 3, wherein:

said bandwidth need of said opportunistic data processor function is responsive to a fullness level of the opportunistic data processor's buffer.

5. The encoder of claim 1, wherein:

the opportunistic data processor generates its bandwidth need parameter such that bandwidth is allocated to the opportunistic data processor only when the global quantization level is less than the threshold quantization level.

6. The encoder of claim 1, wherein:

said function attenuates the bandwidth need of the opportunistic data processor progressively more as the global quantization level is progressively greater.

7. The encoder of claim 1, wherein:

said function monotonically decreases as the global quantization level increases.

8. The encoder of claim 1, wherein:

said function increases toward a value of one as the global quantization level decreases toward a minimum value.

9. The encoder of claim 1, wherein:

the global quantization level is determined according to an average of the bandwidth need parameters of the channel encoders.

10. The encoder of claim 9, wherein:

the bandwidth need parameters of the channel encoders are indicative of a local quantization level thereof.

11. The encoder of claim 1, further comprising:

an interface for interfacing said opportunistic data processor to said packet multiplexer and said quantization level processor.

12. An opportunistic data processor apparatus for use with a multi-channel statistical multiplexing encoder, comprising:
- an opportunistic data processor with a respective buffer for receiving a respective data source; and
- an interface for allowing said opportunistic data processor to communicate with a packet multiplexer and a quantization level processor of the multi-channel statistical multiplexing encoder; wherein:
  - said opportunistic data processor provides a bandwidth need parameter to the quantization level processor via said interface, and, in response thereto, receives a bandwidth allocation and a global quantization level from the quantization level processor via said interface;
  - said opportunistic data processor generates its bandwidth need parameter: (a) by scaling a bandwidth need thereof by a function of the global quantization level, and (b) according to a threshold quantization level;
  - said quantization level processor also receives bandwidth need parameters from a plurality of channel encoders, and, in response thereto, provides bandwidth allocations and the global quantization level to the plurality of channel encoders;
  - the channel encoders and the opportunistic data processor encode their respective data sources according to the global quantization level and the respective bandwidth allocations;
  - said packet multiplexer receives encoded data from the plurality of channel encoders and the opportunistic data processor for forming a transport stream; and
  - the opportunistic data processor generates its bandwidth need parameter such that essentially no bandwidth is allocated to the opportunistic data processor when the global quantization level exceeds the threshold quantization level.

13. The apparatus of claim 12, wherein:
said bandwidth need of said opportunistic data processor is responsive to a fullness level/size ratio of the opportunistic data processor's buffer.

14. The apparatus of claim 12, wherein:
said bandwidth need of said opportunistic data processor is scaled by a range of the bandwidth need parameters.

15. The apparatus of claim 14, wherein:
said bandwidth need of said opportunistic data processor function is responsive to a fullness level of the opportunistic data processor's buffer.

16. The apparatus of claim 12, wherein:
the opportunistic data processor generates its bandwidth need parameter such that bandwidth is allocated to the opportunistic data processor only when the global quantization level is less than the threshold quantization level.

17. The apparatus of claim 12, wherein:
said function attenuates the bandwidth need of the opportunistic data processor progressively more as the global quantization level is progressively greater.

18. The apparatus of claim 12, wherein:
said function monotonically decreases as the global quantization level increases.

19. The apparatus of claim 12, wherein:
said function increases toward a value of one as the global quantization level decreases toward a minimum value.

20. The apparatus of claim 12, wherein:
the global quantization level is determined according to an average of the bandwidth need parameters of the channel encoders.

21. The apparatus of claim 20, wherein:
the bandwidth need parameters of the channel encoders are indicative of a local quantization level thereof.

22. The apparatus of claim 12, wherein:
said interface is provided by a card that plugs into a chassis of said multi-channel statistical multiplexing encoder, said opportunistic data processor being located on said card.

23. The apparatus of claim 12, wherein:
said opportunistic data processor is provided externally to the multi-channel statistical multiplexing encoder.

24. A method for providing an opportunistic data capability to a multi-channel statistical multiplexing encoder, comprising the steps of:
- providing an opportunistic data processor with a respective buffer for receiving a respective data source;
- coupling said opportunistic data processor to a packet multiplexer and a quantization level processor of the multi-channel statistical multiplexing encoder via an interface to allow communication between the opportunistic data processor and the packet multiplexer, and between the opportunistic data processor and the quantization level processor;
- providing a bandwidth need parameter from the opportunistic data processor to the quantization level processor via said interface, and, in response thereto, receiving a bandwidth allocation and a global quantization level at the opportunistic data processor from the quantization level processor via the interface;
- generating a bandwidth need parameter at the opportunistic data processor: (a) by scaling a bandwidth need thereof by a function of the global quantization level, and (b) according to a threshold quantization level;
- receiving bandwidth need parameters from a plurality of channel encoders at the quantization level processor, and, in response thereto, providing bandwidth allocations and the global quantization level to the plurality of channel encoders;
- encoding the respective data sources at the channel encoders and the opportunistic data processor according to the global quantization level and the respective bandwidth allocations; and
- receiving encoded data from the plurality of channel encoders and the opportunistic data processor at the packet multiplexer for forming a transport stream;
- wherein the opportunistic data processor generates its bandwidth need parameter such that essentially no bandwidth is allocated to the opportunistic data processor when the global quantization level exceeds the threshold quantization level.

* * * * *